US007509654B2

(12) United States Patent
Jennings et al.

(10) Patent No.: US 7,509,654 B2
(45) Date of Patent: Mar. 24, 2009

(54) DATA-DRIVEN AND PLUG-IN DEFINED EVENT ENGINE

(75) Inventors: Terry D. Jennings, Westminster, CO (US); Richard S. Youngkin, Littleton, CO (US)

(73) Assignee: Avaya Inc., Basking Ridge, NJ (US)

( * ) Notice: Subject to any disclaimer, the term of this patent is extended or adjusted under 35 U.S.C. 154(b) by 790 days.

(21) Appl. No.: 11/239,742

(22) Filed: Sep. 29, 2005

(65) Prior Publication Data

US 2007/0073739 A1 Mar. 29, 2007

(51) Int. Cl.
*G06F 13/00* (2006.01)

(52) U.S. Cl. ........................ 719/318; 717/100; 717/106

(58) Field of Classification Search ................. 719/318; 717/100, 106

See application file for complete search history.

(56) References Cited

U.S. PATENT DOCUMENTS 5,870,590 A * 2/1999 Kita et al. ...................... 716/4
7,010,778 B2 * 3/2006 Cook ......................... 717/106
7,284,048 B2 * 10/2007 Jakobson et al. ............ 709/224
2004/0010791 A1 * 1/2004 Jain et al. ................... 719/318
2006/0045121 A1 * 3/2006 Monk ......................... 370/461
2006/0218161 A1 * 9/2006 Zhang et al. ................ 707/100

OTHER PUBLICATIONS

K. Stewart, "XML Finite State Machine in C#", The Code Project, Apr. 1, 2002, pp. 1-2, Internet article.
D. Kuhlman, "An Application Generator for Albatross", Jul. 5, 2002, pp. 1-6, Internet article.
"Project HTTPush: Document Manager: Display Document", SourceForge.net, 2005, pp. 1-10, Internet article.
R. Filho "YANCEES: Yet Another Configurable Extensible Event Service", Mar. 18, 2004, pp. 1-13, Internet article.
"Java Finite State Machine Framework" eVelopers Corporation, 2003, pp. 1-15, Internet article.

* cited by examiner

*Primary Examiner*—Andy Ho
(74) *Attorney, Agent, or Firm*—Doug Grover

(57) ABSTRACT

An event engine enables application developers to define finite state machines (FSMs) that they want to implement, via a data-driven approach as opposed to having to hardcode the FSMs. The event engine has three notable characteristics:

computations may be associated with FSM state transitions, the set of computations that is associated with each transition is specified by data (illustratively an XML document), and the particulars of the computations are defined and handled by plug-ins, each with the same interface.

22 Claims, 4 Drawing Sheets

DATA-DRIVEN AND PLUG-IN DEFINED EVENT ENGINE

TECHNICAL FIELD

This invention relates to event-processing arrangements.

BACKGROUND OF THE INVENTION

An event is simply an action or an occurrence detected by a program, and event processing involves determining what to do in response to the detection. Event processing arrangements often employ finite state machines (FSMs) to keep track of detected events and their effect.

Known event-processing arrangements define which events must be detected, and rules for processing them, in software executables or libraries. For example, the Java Finite State Machine Framework provides extensible actions for FSM transitions, which are fixed in code. Therefore, changes to the event-processing rules or to the sets of events to be detected require software developers to make the changes by modifying the event-processing code and delivering a new version of the entire event-processing system. The time, effort, and expertise that are involved in making these changes can be significant. But no way is provided to extend the FSM without code changes. Workflow-event-processing systems may use data files to describe event flows. But they, too, lack extensibility without reprogramming, and further lack ability to associate computations with event transitions. Also known are implementations of FSMs where the set of states and state transitions are described in XML or other-format data files. But these implementations have no computational ability on state transitions, and so cannot be employed to express event-processing rules. And, while some of these implementations may allow actions to be associated with FSM states, they provide only a fixed set of actions that are defined as a part of the FSM code, and thus are not extensible without reprogramming of the FSM. The use of plug-ins for handling elements of XML documents is also known. They are generally used to extend the capabilities of browsers, but the use of plug-ins driven by XML tags is also known in event publish/subscribe contexts. But changing or adding of new processing rules, even if the rules are implemented as plug-ins, requires delivery of new system software.

SUMMARY OF THE INVENTION

This invention is directed to solving these and other problems and disadvantages of the prior art. According to the invention, there is provided an event engine that enables application developers to define finite state machines (FSMs) that they want to implement, via a data-driven approach as opposed to having to hardcode the FSMs. The event engine has three notable characteristics:

- computations may be associated with FSM state transitions,
- the set of computations that is associated with each transition is specified by data (illustratively an XML document), and
- the particulars of the computations are defined and handled by plug-ins, each with the same interface.

These characteristics provide an easily extensible, data-driven event engine implementation. They allow the sets of computations and the computations themselves to be modified just by changing data and plug-ins and without having to redesign (e.g., reprogram) the core event engine.

BRIEF DESCRIPTION OF THE DRAWING

These and other features and advantages of the invention will become more apparent from the following description of an illustrative embodiment of the invention considered together with the drawing, in which.

DETAILED DESCRIPTION

1. Architecture

Figure 1:
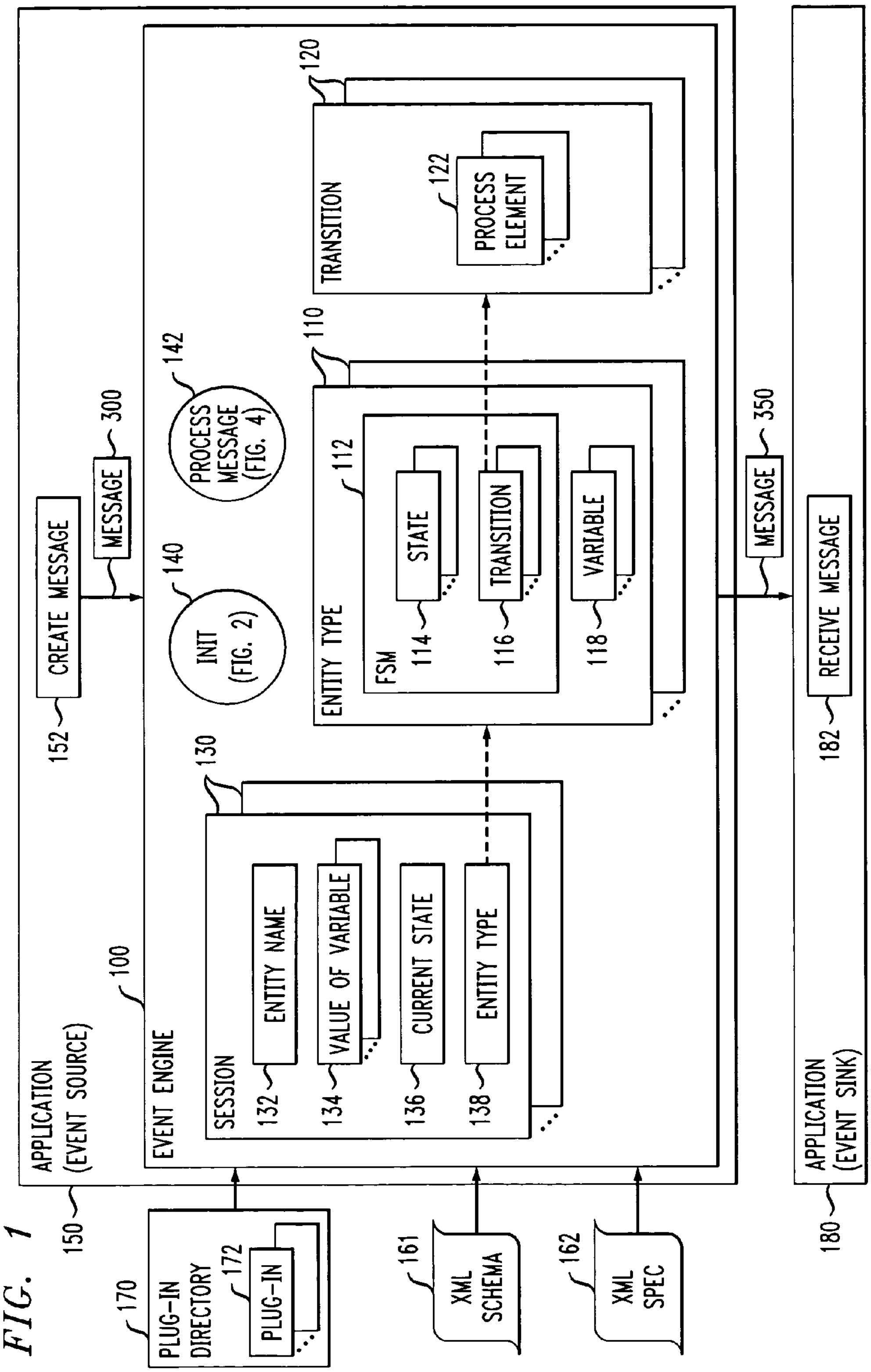
FIG. 1 is a block diagram of an event engine that includes an illustrative embodiment of the invention.

Shown in FIG. 1 is an event engine 100. Event engine 100 is a generic, reusable component. It is used inside a Real-Time Event Management (RTEM) subsystem and provides the core of event processing. It accepts messages 300, processing them according to directives specified in an event engine XML file. Event engine XML files describe event processing in such a way that event engine 100 remains neutral about what events and entities it deals with. Event engine 100 emits messages 350 according to the event engine XML file. Emitted events queue for waiting event receivers that have registered for the events.

Event engine 100 is a library of Java classes that is available for use by (e.g., embedded in) event-sourcing applications 150. It is illustratively defined in extensible markup language (XML), although any desired suitable language may be used. The runtime core, or framework, of event engine 100 is defined by an XML design document, referred to herein as an XML specification 162 (spec for short). An XML schema 161 specifies rules for a well-formed XML spec 162; it specifies the syntax of spec 162. Illustratively, schema 161 is defined with XSCHEMA or a Document Type Definition (DTD). XML spec 162 defines the name and the basic elements of event engine 100: entity types 110, and their corresponding FSMs 112 in terms of states 114 and transitions 116. An entity is the “thing” (for example, a call center agent, a contact, or a call to an agent) whose states and state transitions are represented by a corresponding FSM. For each entity type 110, XML spec 162 contains a corresponding FSM description that specifies the states and state transitions of the FSM 112 for that entity type. For each entity type 110, XML spec 162 also defines variables 118 that are global across that entity type. XML spec 162 further defines the functionality 140 of event engine 100 for initializing itself, and the functionality 142 of event engine 100 for processing events (messages).

The rest (the particulars of an implementation) of event engine 100 is also described by XML spec 162. XML spec 162 defines instances of elements of XML schema 161. XML spec 162 defines instances of the entity types 110, referred to herein as entities. XML spec 162 specifies each entity’s name; the names, types, and initial values of its state variables; and the initial state of the entity’s FSM instance.

For each type of state transition 120, XML spec 162 specifies the computational elements that are associated with that transition. A computational element is an action that is performed upon occurrence of the transition with which the computational element is associated. Thus, the actions that result from an FSM state transition may be changed easily just by changing XML spec 162.

Each computational element is specified in XML spec 162 by its name, referred to herein as a "verb". The verb illustratively serves as a short-hand description of the computational element's function, such as "emit", "compute", "dictionary", or "conditional", for example. XML spec 162 does not specify the particulars of the computations or syntax that constitute the computational element. These computational particulars are specified and handled by plug-ins 172. A plug-in 172 is a software module that adds a specific feature or service to the larger system. Thus, computational elements and their actions may be added to or changed just by changing or creating a new plug-in and without changing the core event engine 100. Advantageously, plug-ins 172 have the same names (verbs) as their corresponding syntax elements, so as to make the correspondence easy to establish and follow.

Here is an example of an XML spec 162:

```
<?xml version="1.0"?>
<EventEngine xmlns="http://www.avaya.com"
    xmlns:xsi="http://www.w3.org/2001/XMLSchema-instance"
    xsi:schemaLocation=
            "http://www.avaya.com
             EventEngine.xsd">
    <comment>
        Create an "agent" entity. The engine creates a special
variable, 'entity'._id
'entity'._id
        to reference the particular instance of the entity. For the
agent entity, the
        engine creates agent._id.
    </comment>
    <entity>
        <name>agent</name>
        <collection>
            <comment> This defines a collection-level variable
called 'agent.collection.count' </comment>
            <attribute>
                <name>count</name>
                <type>integer</type>
                <value>0</value>
            </attribute>
        </collection>
        <comment> This defines a entity-level variable called
'agent.duration' </comment>
        <attribute>
            <name>duration</name>
            <type>long</type>
            <value>0</value>
        </attribute>
        <comment>Define the state machine for agent</comment>
        <state>
            <name>logged_off</name>
            <comment> Agent is logged off </comment>
            <comment> state-local variable called
"agent.logged_off.time"
</comment>
            <attribute>
                <name>time</name>
                <type>long</type>
                <value>0</value>
            </attribute>
        </state>
        <state>
            <name>logged_in</name>
            <comment> Agent is logged in.</comment>
            <comment> state-local variable called
"agent.logged_in.time"
</comment>
            <attribute>
                <name>time</name>
                <type>long</type>
```

-continued

```
                <value>0</value>
            </attribute>
        </state>
        <comment>
            transition from "logged_off" to "logged_in" when a
LOGIN message comes in
        </comment>
        <transition>
            <message>LOGIN</message>
            <from>logged_off</from>
            <to>logged_in</to>
            <comment>
            Collection-level attributes are referenced as
'entity'.collection.'attribute'
            State attributes are referenced as
'entity'.'state'.'attribute' or 'state' for the current (to)
            state.
            Message fields are referenced as
_message.'field'
        </comment>
        <compute>agent.count = agent.count + 1</compute>
        <compute>agent.logged_in.time =
_message.time</compute>
        <compute>agent.duration = agent.logged_in.time -
agent.logged_off.time</compute>
        <emit>
            <message>UpdateAgentCount</message>
            <field>
                <name>count</name>
                <type>integer</type>
                <value>agent.collection.count</value>
            </field>
        </emit>
        <emit>
            <message>UpdateAgentState</message>
            <field>
                <name>agent</name>
                <type>long</type>
                <value>agent._id</value>
            </field>
            <field>
                <name>state</name>
                <type>string</type>
                <value>agent.state</value>
            </field>
        </emit>
    </transition>
    <comment> transition from "logged_in" to "logged_off" when a
LOGOFF message comes in </comment>
    <transition>
        <message>LOGOFF</message>
        <from>logged_in</from>
        <to>logged_off</to>
        <compute>agent.collection.count =
agent.collection.count - 1</compute>
        <compute>agent.logged_off.time =
_message.time</compute>
        <compute>agent.duration = agent.logged_out.time -
agent.logged_in.time</compute>
        <emit>
            <message>UpdateAgentCount</message>
            <field>
                <name>count</name>
                <type>integer</type>
                <value>agent.collection.count</value>
            </field>
        </emit>
            <emit>
                <message>UpdateAgentState</message>
                <field>
                    <name>agent</name>
                    <type>long</type>
                    <value>agent._id</value>
                </field>
                <field>
                    <name>state</name>
                    <type>string</type>
                    <value>agent.state</value>
                </field>
```

-continued

```
            </emit>
        </transition>
    </entity>
</EventEngine>
```

The first line of the file describes the file as an XML file. The next element includes XML schemas and namespaces (one for XML schemas and one for the event engine XML schema). The example includes one <entity> element, an "agent" entity. It declares several variables of various scopes and then describes the state machine for the entity. There are two states: "logged_off" and "logged_in". The transitions describe what messages cause state transitions. Inside the <transition> element are processing directives. <compute> describes computations to be made and <emit> describes messages to be emitted. Each <emit> element includes the message to emit and fields to include (along with how to set the field values). Final states include the '<final/>' sub-element so event engine 100 can tell when to terminate a session.

The core event engine 100 is created from XML schema 161 and XML spec 162 in a conventional manner. The core event engine 100 comprises a collection of prototype objects (illustratively, Java classes) of entity types 110 that implement the entity type's corresponding FSMs 112 (states 114 and state transitions 116), a message-handling ("process message") function 142, and an event-engine initialization ("init") function 140.

When event engine 100 starts, it parses event engine XML files, constructing Java objects according to the elements inside the event engine XML files. These elements list what entities are to be processed, the finite state machine (states and transitions) for each entity, variables, and what events to emit. There are Java objects for entity and variable declarations.

Figure 2:
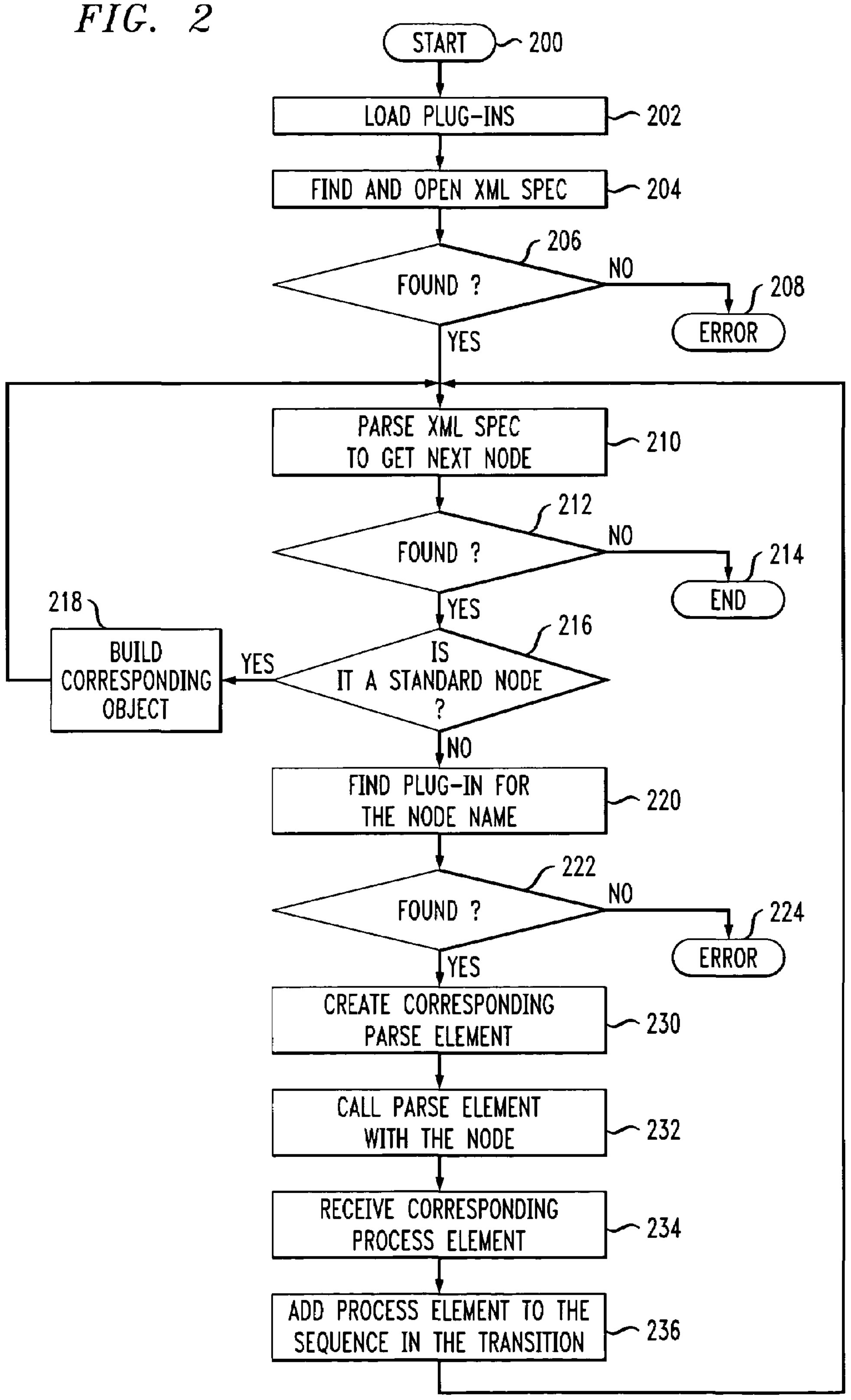
FIG. 2 is a flow diagram of event-engine initiation functions of the event engine of FIG. 1.

Operations of function 140 are shown in FIG. 2. Upon start-up, at step 200, core event engine 100 is given a directory name of a directory 170 of plug-ins 172 and a name of XML spec 162, and it performs initialization function 140. Event engine 100 uses directory name 170 to find and load plug-ins 172, at step 202. Event engine 100 uses the name of XML spec 162 to find and open XML spec 162, at step 204. If XML spec 162 is not found, as determined at step 206, it is an error and event engine 100 cannot proceed further, at step 208. If it finds XML spec 162, event engine 100 parses XML spec 162 to find the next (first, in this instance) node, at step 210. A node is a portion of the XML spec that defines an element (e.g., an entity, a state, or a transition) of event engine 100. If a next node is not found, as determined at step 212, event engine 100 is done with its initialization, at step 214. If it finds a next node, event engine 100 checks if it is a standard node, at step 216. Standard nodes are those that are standard within XML schema 161. That is, nodes that instantiate elements that are defined by XML schema 161, such as entities, states, and transitions. If the node is a standard node, event engine 100 builds a corresponding object, in a conventional manner, at step 218, and then returns to step 210 to find and process the next node in XML spec 162. The object is a particular form of a compiled implementation of the element in memory. Illustratively, the objects are implemented in memory by Java classes. The objects created by event engine 100 for an entity are a pointer 138 to the corresponding entity type 110 in the collection of entity types, the values 134 of any variables 118, and the current (initial, in this instance) state 136. Objects created for a state and a transition are state 114 and transition 116, respectively.

As mentioned above, elements under <transition> are handled by plug-ins. Each plug-in implements the Plugin interface. This interface exposes a method to obtain a key for the plug-in. In the case of event engine plugins, the key is the name of the element that the plug-in wants to handle. Plug-ins must also have a manifest attribute identifying which type of plug-in it is. (Different types of plug-ins may be found in the same directory.) The name of the attribute is an agreement between the plug-in and the programming context using the plug-in. For event engine plug-ins, the name of the attribute is illustratively "ParseElement". The value of the attribute is the full class name of the plug-in's class implementing the ParseElement interface. When the event engine initializes, it looks in the plug-ins directory looking for ParseElement plug-ins. When it finds one, it calls the getKey( ) method on the Plugin interface to find the element name this plug-in handles. The event engine adds each of these plug-ins to a Plug-in repository indexed by element key.

An event engine plug-in creator must create a class that implements the ParseElement and Plugin interfaces. The full class name of this implementation class must go into the manifest of the plug-in as the value of the "ParseElement" attribute.

Returning to step 216 of FIG. 2, if the node is not a standard node—for example, if the node name is a verb, meaning that the node instantiates a computational element—event engine 100 searches through plug-ins 172 to find one of the same name, at step 220. If a corresponding plug-in 172 is not found, as determined, at step 222, it is an error, and event engine 100 cannot proceed further, at step 224. If it finds a corresponding plug-in 172, event engine 100 creates an object instance of that plug-in 172, referred to herein as a parse element, at step 230, and passes the current node to the parse element (i.e., calls its parse method with the current node), at step 232.

The parse element processes the node and its subtree and builds a corresponding object, referred to herein as a process element 122, that is initialized according to the information conveyed by the node and subtree. The parse element then returns the process element 122 (a pointer thereto), in a conventional manner. When event engine 100 receives process element 122, at step 234, it adds the process element 122 (a pointer thereto) to the sequence of process elements that are associated with the corresponding transition 120 in the collection of transitions, at step 236. Event engine 100 then returns to steps 210 et seq. to get and process the next node of spec 162.

When event engine 100 is initialized, it is ready to be embedded in an application 150 in order to process messages 300. Event engine 100 requires several pieces of information from messages:

- What the message is (i.e., opcode, event id, etc.)
- What entity or entities this event belongs to
- What instance of the entity or entities does this message belong to
- What fields and their values the message contains.

Figure 3:
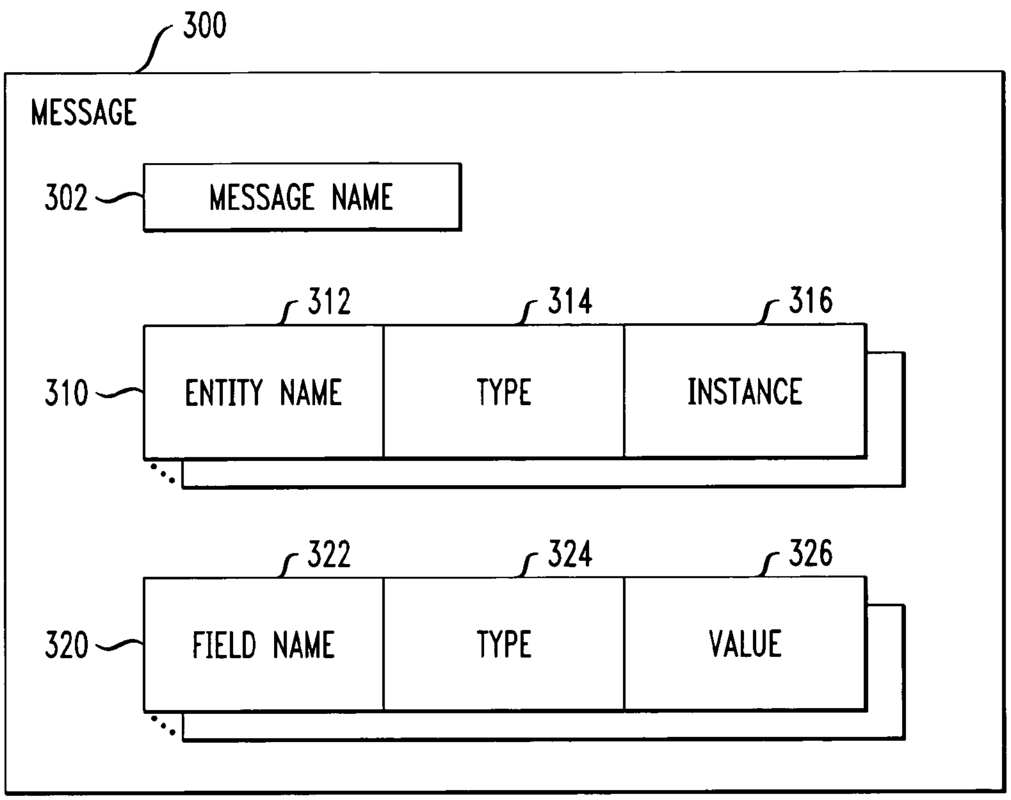
FIG. 3 is a block diagram of a message (event) that is processed by the event engine of FIG. 1.

As shown in FIG. 3, a message 300 comprises a message name 302, a list of entities that are destinations of message 300, and a list of fields. Each item 310 in the list of entities comprises an entity name 312, entity instance 316, and a data type 314 of instance 316. Each item 320 in the list of fields comprises a field name 322, value 326, and data type 324 of value 326 (e.g., integer, string, time stamp, etc.). Event engine 100 needs to be able to iterate over the fields to find a particular field 320.

Figure 4:
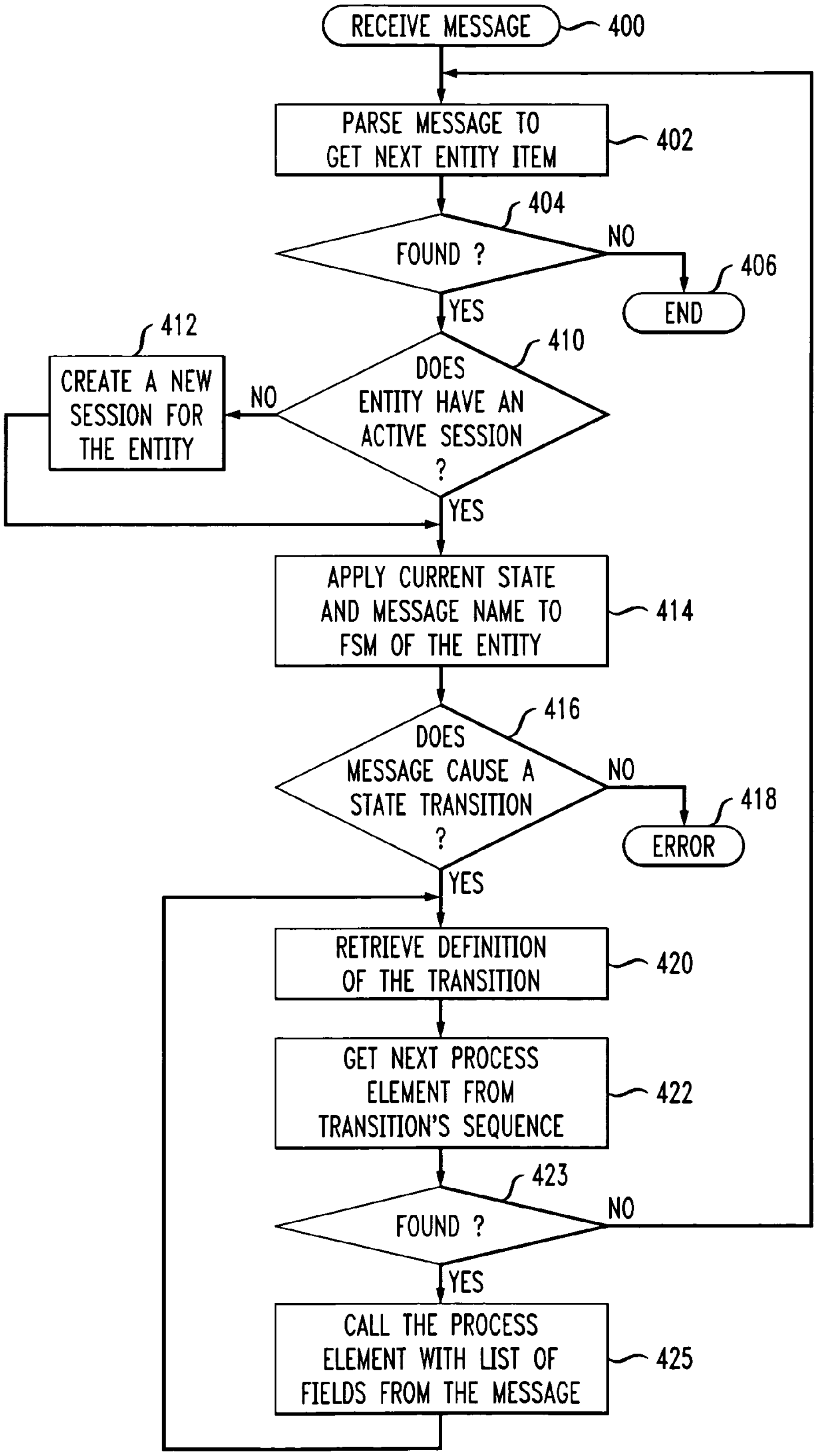
FIG. 4 is a flow diagram of message-processing functions of the event engine of FIG. 1.

When a create-message function 152 of application 150 creates a message 300, it calls event engine 100 and passes message 300 to it for processing. Message processing is shown in FIG. 4. Event engine 100 has a method, processMessage( ), for processing incoming messages. In response to receiving message 300, at step 400, event engine 100 parses message 300 to get the next (first, in this instance) item 310 from the list of entities, at step 402. If there isn't one, as determined in step 404, event engine 100 is done, at step 406. If it finds an item 310, it uses the item's entity name 312 and checks the collection of sessions 130 to determine if there is an active session 130 with the same entity name 132, at step 410. If not, it creates a session 130 object for this instance of the entity and adds it to the collection of sessions, at step 412. The session object 130 includes the entity instance id 132, a set of local variables 124, current state 136, and a pointer 138 to the corresponding entity type. Once the engine obtains the active session, the session, message and entity (with FSM) are used to calculate the next FSM state and to process any compute and emit directives. (While event engine 100 maintains a collection of entity objects and a separate collection of active session objects, a design alternative is to merge entity and session together and maintain one collection.) Thereafter, or if a corresponding session 130 was found to exist, event engine 100 retrieves current state 136 of the entity from that entity's session 130 and the name 302 of received message 300 and applies them to the FSM 112 defined for the entity's type 110 in the collection of entity types, at step 414, to determine if the message causes a state transition 116 from the current state, at step 416. If not, it is an error, and event engine 100 does not proceed further, at step 418. If message 300 does cause a transition 116, event engine 100 retrieves the definition 120 of transition 116 from the collection of transitions, at step 420, and gets the next (first, in this instance) process element 122 from the sequence of process elements in the transition definition 120, at step 422. If it finds that it is at the end of the sequence of process elements 122, as determined at step 424, event engine 100 returns to step 402 to parse out and process entity name 312 from the next item 310 in the list of entities in message 300. If it finds a next process element 122, at step 424, event engine 100 calls that process element 122 and passes it the list of fields 320 from message 300, at step 426. Event engine 100 then returns to steps 422 et seq. to get and process the next process element 122 from the sequence of process elements of transition 120.

Process element 122 processes the received information in a conventional manner. For example, it modifies the information in session 130 of the named entity, such as the values 134 of variables. Process element 122 may also create and send a message 350 to a receive message function 172 of another (event sink) application 170. Message 350 may be, for example, a reflection (for example, a reformatted version) of message 300. Or, message 350 may carry values of state variables 118, or values derived from state variables 118, or other values computed by process element 122. Application 170 may be, for example, a record-keeping application that stores and reports information about entities.

Figure 5:
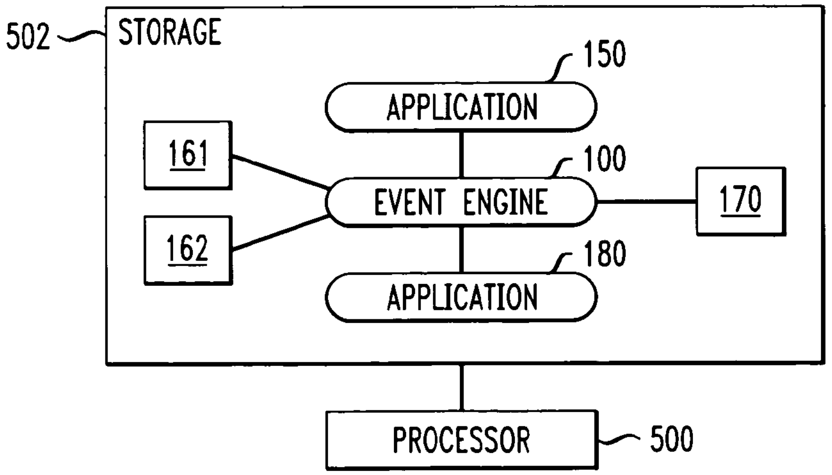
FIG. 5 is a block diagram of a stored-program-controlled system that includes the event engine and other elements of FIG. 1.

The elements shown in FIG. 1 form a part of a stored-program controlled apparatus that comprises computer storage 502 (illustratively including both random-access memory and offline storage, such as a disk) that stores the elements of FIG. 1, and a processor 500 that uses and executes the elements of FIG. 1 from storage 502, as shown in FIG. 5, all in a conventional manner. Illustratively, event engine 100 and its elements, as well as plug-ins 172, are implemented as executable objects, such as instances of Java classes.

2. Interfaces

2.1 EventEngine Class

The EventEngine class is the primary interface for the EventEngine. It contains the following public methods:

- EventEngine(SessionPolicy policy)—The constructor takes a call-back function policy object for new session handling. In the RTEM case, the policy checks licenses for concurrent agent sessions.
- EventEngine(SessionPolicy aSessionPolicy, ErrorHandler aErrorPolicy)—constructor that adds a policy object for handling errors.
- initialize(String XMLfile, String rootPath)—this method loads the EventEngine behavior from the XMLfile. Plugins for handling elements (extensions to the basic EventEngine XML schema) are found in the "plugins" directory under rootpath. The basic flow is:
  - Load the plugins into the ParseElementCollection (all plugins should be moved into a formal plugin implementation).
  - Create a document object model (DOM) parser (illustratively, the Xerces-J Java Parser)
  - Pass the XMLfile to the DOM parser. The DOM parser returns a tree structure corresponding to the structure of the XML document.
  - Traverse the DOM tree using call-back functions of ParseElement objects for subelements under transition (see ParseElement and ProcessElement below). The implementation parses <entity>, <state>, <transition>, <attribute>.
  - For each entity found, create an Entity object and add <name>->Entity to the hash/map of entities. If there are any collection attributes, create them and add them to globalAttributes.
  - For each state under entity, add the state: entities[entity ].addState( name, isFinal)
  - For each transition, create a Transition object and add it to the entity's transitions: entities[entity ].addTransition(transition)
  - For each subelement under <transition>, find parseElement=parseElements.getParseElement(elementName). If not one, error. Else, transition.addProcessElement( parseElement.getProcess Element( ))
- processMessage(Message message, ArrayList Messages)—this method processes a message. It returns an ArrayList of Message objects for emitted messages. The basic flow is:
  - Check to see if the message entities are in the known entities.
  - Check to see if the message entity instances (Attribute objects) have active sessions.
  - If not, pass the entity and instance to the SessionPolicy object to check to see if a new session is allowed. If so, create a new Session object.
  - Look for a transition from the current state (in the Session) with the message: entity.findTransition(session-.getstate( ), message.getName( )). If not, error.
  - Call the transition's sub-elements (e.g., <compute> and <emit>) processing: (transition.process(message, Messages).

If the new current state is final, call the SessionPolicy object to allow end of session processing (like releasing the license). Else, record the new state in the Session object.

shutdown( )—release all memory and objects addAttribute(String attributeName, Attribute attribute)

The EventEngine class maintains the following (private) data:

map/hash of active entities: <entityName>-> Entity map/hash of active sessions: Pair<entityName,entityInstance>-> Session ParseElementCollection parseElements (all registered element parsers)

AttributeCollection of global attributes: globalAttributes

AttributeCollection of local attributes (e.g., state attributes): localAttributes 2.2 Attribute Class The Attribute class manages attributes and operations on them. It implements a Cloneable interface and includes the following public methods:

Attribute(<type> value)—creates an Attribute object of <type> with value value where type is int, long or String Attribute(Attribute value)—copy constructor factory(int enumType, String value)—static factory pattern for creating Attribute objects using the enums described below.

factory(String type, String value)—static factory pattern for creating Attribute objects.

add(Attribute addend)—If the types are okay (int-int, long-long, long-int, etc.), adds the value of addend to the current object's value. Returns true/false.

add(int or long value)—If the types are okay, adds value to the current object's value. Returns true/false.

subtract(Attribute addend)—similar to above subtract(int or long value)—similar to above multiply(Attribute operand), multiply(int or long value), divide(Attribute operand, divide(int or long value)—similar to above.

setValue(<type> value)—replaces the object's current value with value. Returns true/false.

getvalue( )—returns the object's current value as a string getType( )—returns the object's current type as a string Note: global attributes have the name <entity>.collection. All other attributes are local to the session.

The Attribute class types Attributes according to the following enum-like data members:

NULL_ATTRIBUTE—undefined type

INT_ATTRIBUTE—an integer Attribute

LONG_ATTRIBUTE—a long Attribute

STRING_ATTRIBUTE—a String Attribute

TIMESTAMP_ATTRIBUTE—a timestamp 2.3 AttributeCollection Class

AttributeCollection maintains a collection of attributes with their names in a map/hash. It implements the Cloneable interface. Methods include:

AttributeCollection( )—default constructor setAttribute(String name, Attribute attribute)—adds/replaces an attribute in the collection getAttribute(String name)—returns the Attribute for name or an empty Attribute.

entrySet( )—returns a Set of Entry classes for iteration

Private data includes:

hash/map of <name>-> Attribute 2.4 SessionPolicy Interface

The SessionPolicy interface allows creation of a mix-in class to allow policy decisions on new sessions and to allow external references to sessions when they are removed. RTEM, for instance, creates a SessionPolicy object that checks for licenses when a new session is created and releases the license when the session is deleted. The SessionPolicy interface includes:

newSession(String entity, long instance)—returns a boolean indicating that a new session for this entity/instance may be created.

removeSession(String entity, long instance)—notification that a session is about to be removed.

2.5 ErrorHandler Interface

The ErrorHandler interface allows creation of a mix-in class to deal with error conditions. EventEngine callers can create their own implementations of this interface with various policies. The default ErrorHandler, PrintAndGoOn, prints error information to the console and continues execution. The ErrorHandler interface includes:

errorOccurred(String location, String errortext)—called when an error occurs (and no Session or Message is available). "location" indicates a general area (e.g., "parsing", "processing", "plugins") where there error occurred. Each location is specified as static final strings of ErrorHandler. "errortext" gives specific information about the error. This method returns a boolean to indicate whether or not to continue (true means continue)

errorOccurred(String location, String errortext, Session session, Message message)—called when an error occurs. This method returns a boolean to indicate whether or not to continue (true means continue). ErrorHandler implementations may modify session attributes using Session and Message.

2.6 Message Class

The Message Class contains all information about events. It includes the following public methods:

Message(String name, AttributeCollection entities)—creates a message with name and relevant entities.

Message(String name)—creates a message with name

Message(TransportableMessage message)—creates a message from a TransportableMessage.

getEntities( )—returns the entities associated with this message addEntity(String name, Attribute value)—add an entity with this name and value getFields( )—returns the fields associated with this message addField(String name, Attribute value)—adds/replaces a field in the private fields map/hash: fields.setAttribute (name, value)

getField(String name)—returns the Attribute value for name or an empty value if name does not exist in the message: fields.getAttribute(name)

getName( )—returns the message name

The Message Class contains the following private data:

AttributeCollection for entities

AttributeCollection for fields string for name 2.7 Plugin Interface

The Plugin interface provides a generic plug-in capability. All plug-ins must implement the Plugin interface and provide a manifest with a special entry in it. The Plugin interface has one method, getKey( ), that returns the name of the plug-in. Software that calls plug-ins uses the key in an appropriate way. In the EventEngine, plug-ins are used to handle any subelements under <transition>. <compute>, <dictionary> and <emit> have plug-ins whose keys are, respectively, "compute", "dictionary" and "emit". Dictionary elements further use plug-ins for each type of dictionary. In this case, the key matches the <name> subelement under <dictionary>.

The manifest provides a plug-in mechanism for providing the full class name to software that uses the plug-in. In the case of <compute>, <emit>, et cetera, each plug-in has an attribute whose name is ParseElement and whose value is the full path name of the class implementing ParseElement. The EventEngine looks for plug-ins implementing the ParseElement interface (by looking at their manifests). The value of the ParseElement attribute in the manifest is a full class name that is passed to the class loader to load.

2.8 PluginContainer Interface

The PluginContainer interface provides a generic way to maintain a collection of plug-ins. AttributeCollection implements this interface. The methods in this interface are:

addplugin(String aName, Plugin aPlugin): add a plug-in to the collection indexed by aName.

getPlugin(String aName): return the plug-in indexed by aName or null if none.

2.9 Plugins Class

The Plugins class provides a mechanism to find and load plug-ins into a container. Its public methods include:

addPlugins(String aDirectory, String aManifestName, PluginContainer aContainer): This method looks for all jar files in aDirectory and uses the reflection API to examine them. It looks for attributes in the jar's manifest for attributes whose name matches aManifestName. When it finds one, it instantiates the plug-in and adds it to aContainer using the addplugin( ) method.

2.10 TransportableMessage

The TransportableMessage class provides a container for the Message class that Inter-Process Communication (IPC) can transport. All the semantics of converting to and from transportable form resides in Message, AttributeCollection, and Attribute. The transportable format looks like:

```
<message name>;<entities>;<fields>
```

Where <entities> and <fields> have the format:

```
[<name>=(<type>)<value>,...]
```

Special characters like "=", ";", et cetera, are escaped using the form "%XX" where XX is the hex value for the character.

TransportableMessage includes these methods:

TransportableMessage( ): default constructor

TransportableMessage(Message): load a transportable message from a Message getData( ): returns the TransportableMessage in String form setData(String): set the transportable message from String 2.11 Internal Interface These sections describe classes internal to the Event Engine.

2.11.1 Entity Class

The Entity class records all states and transitions for a particular entity. It includes the following public methods:

Entity(String name)—constructor saves the entity name in a private data member addState(String state, boolean isFinal)—adds a state to the map/hash of states findState(String state)—returns a −1 for state doesn't exist; 0 for state exists; and 1 for state exists and is final firstState( )—returns the state name for the starting state for this entity addTransition(String state, String message, Transition transition)—adds a Transition to the map/hash of transitions findTransition(String state, String message)—returns a Transition object for a transition from state with this message. Returns an empty Transition object if no transition exists.

setAttribute(String name, Attribute attribute)—add/replace attribute with name in the Entity's collection getAttribute(String name)—return the Attribute for this name (or null)

getLocals( )—return the AttributeCollection of Entity-local Attributes for this Entity getName( )—return the name of this Entity The Entity class has the following private data members:

String name—entity name hash/map of <stateName>-> boolean (true if final state)

map/hash of Pair<String state, String message>-> Transition

The Entity class defines the following enum-like data members:

NOT_FOUND—state does not exist

EXISTS—state exists and is not final

IS_FINAL—state exists and is final 2.11.2 Session Class

The Session class maintains information about active entity sessions. It includes the following public methods:

Session(String entity, Attribute instance, String state, AttributeCollection global, AttributeCollection local)—create a new session for a particular instance of an entity. The basic flow is:

Store entity, instance, state, and global in private data members

Clone local into a private data member (localAttributes)

Create an Attribute from entity +".id", type and value from instance and add it to localatributes Create an Attribute from entity +".state", type "string", value state and add it to localAttributes getAttribute(String attribute)—returns an Attribute object for the given attribute. This is localAttributes.getAttribute(attribute) or globalAttributes.getAttribute(attribute) for collection-level attributes. If the attribute does not exist, an empty Attribute is returned.

getAttribute(String attribute, Message message)—returns an Attribute object for the given attribute. This method finds any attribute in the namespace, including _message attributes.

setAttribute(String attribute, Attribute attribute)—If this is a global attribute, globalAttributes.setAttribute(attribute) else localAttributes.setAttribute( attribute). Returns true/false.

setAttribute(String attribute, Attribute, Message message)—add/replace an Attribute in the Session including name resolution of "!" attribute names getState( )—return the current session state.

putState(String state)—set a new current state.

getEntity( )—returns a String for the Entity name for this session getInstance( )—returns an Attribute for the current instance of this session 2.11.3 ParseElement Interface The ParseElement interface is used by plugin objects to handle each element in the EventEngine schema (or its extensions). It includes the following public methods:

initialize(Node node, String rootPath)—examine this node for parsing. rootPath is the root directory path for this EventEngine instance getProcessElement( )—returns an object implementing the ProcessElement interface for this Node.

factory( )—return a unique, shallow-copy ParseElement object for this object (returns a clone)

2.11.4 ComputeParseElement Class Implements ParseElement

The ComputeParseElement class parses <compute> elements and returns a ComputeProcessElement. The public methods are:

initialize(Node node, String rootPath)—<compute> has one TEXT subelement for the statement to be computed. The TEXT subelement will be stored in a private data member (string statement) inside the object.

getProcessElement( )—parses the private statement string. Since these statements have the form: attributeC gets attributeA op attributeB, an appropriate invoke (from Reflection package) statement can be constructed for the statement (see ProcessComputeElement below).

factory( )—returns a shallow copy of ComputeParseElement 2.11.5 EmitParseElement Class Implements ParseElement The EmitParseElement class parses <emit> elements and returns a EmitProcessElement. The public methods are:

initialize(Node node, rootPath)—loop through the sub elements of node:

If the sub element is a <message>, store the message name

If the sub element is a <field>, create a Tuple< String name, String type, String value > and add it to a Tuple array, fields getProcessElement( )—take the message name and fields to construct a EmitProcessElement object and return it.

factory( )—returns a shallow copy of EmitParseElement

The EmitParseElement class has the following private data:

String messageName

Tuple<String,String,String> fields 2.11.6 ParseElementContainer Class

The ParseElementContainer contains a reference to all registered ParseElement objects. It includes the following public methods:

ParseElementcontainer( )—default (empty) constructor addParseElement(String entityName, ParseElement handler)—add handler to the map/hash of ParserElement objects. Returns a boolean to indicate success.

getParseElement(String entityName)—return the ParseElement for entityName. Returns an empty ParseElement if none.

2.11.7 ProcessElement Interface

The EventEngine uses objects implementing the ProcessElement interface to process sub elements of <transition> elements, including <compute> and <emit>. It includes the following public methods:

Process(Session session, Message message, ArrayList messages)—called to execute a processing step. It is expected that all ProcessElement objects will have data appropriate to their own processing. For instance, the processEmit object must record the message name and fields to emit. Message may be used for processing. Any returned (emitted) message are returned in the ArrayList of messages.

2.11.8 ProcessCompute Class Implements ProcessElement

The ProcessCompute class executes a statement of computation contained in the text field for the <compute> element. Each statement looks like attributeC=attributeA op attributeB. There are two design approaches. In approach 1, ProcessCompute will use an InvocationHandler to invoke the appropriate Attribute method (“add” for “+”, “subtract” for “−”, etc.) on attributeA and attributed. This looks like:

Build a Method object, m, for the appropriate Attribute opcode’s method

Object[ ] args; args[0]=attributeB

Call AttributeC.setValue(m.invoke(attributeA, args))

In approach 2, ProcessCompute has derived Objects, one per Attribute opcode. The AddProcessCompute’s Process method, for example, returns attributeC.setValue(attributeA.add(attributeB))

In either case, ProcessCompute will retrieve Attribute objects for attributeA, attributeB and attributeC (which are all strings) each time ProcessCompute is called. This may be optimized to do the lookup once.

The public methods look like:

ProcessCompute(String attributeA, String attributeB, String attributeC, String Opcode)—constructor records its arguments in private data fields Process(Session session, Message message, ArrayList Messages)—implements either of the two approaches above. No messages are emitted 2.11.9 ProcessEmit Class Implements ProcessElement ProcessEmit handles processing for <emit> tags under <transition>. Its public methods look like:

ProcessEmit(String messageName, TripleString [ ] fields)—default constructor records messageName and fields in private data members. Each field consists of a string for the field name, a string for the field type and a string for the field value (all from the XML sub elements of <emit>. The fields are stored as strings because the values cannot be evaluated without a Session context.

Process(Session session, Message message, ArrayList messages)—Basic flow is:

Construct a Message m(messageName, NullEntities). There may be an <entity> subelement under <emit>.

For each TripleString, create an Attribute, attr, from fields[i].getString1( ) (the name), fields[i].getString2( ) (the value) and session.getAttribute(fields[i].getString3( )) (the value), Then, m.addField(name, attr).

Take the name, entities, and attributes (from above), create a Message and add it to the messages ArrayList 2.11.10 TripleString Class The TripleString class is a container of string triples. It includes the following public methods:

TripleString(String s1, String s2, String s3)—constructor saves its arguments in private data members: string1, string2, string3 getString1( )—returns string1 getString2( )—returns string2 getString3( )—returns string3

2.11.11 Transition Class

The Transition Class captures processing for <transition> elements. It includes these public methods:

Transition(String toState)—constructor records its argument in private data fields.

addProcessElement(ProcessElement process)—adds a ProcessElement to a private array of ProcessElements.

process(Session session, Message message, ArrayList messages)—step through each ProcessElement in the elements array, in order, and call its process( ) method with session, message and messages nextState( )—return the state The Transition class has the following private data:

String state
Integer index
ProcessElement[ ] elements 2.12 ConditionalPlugin

The conditionalPlugin provides specs with a way to programmatically control state transitions rather than only by message name. Like all plug-ins, the <conditional> element occurs under the <transition> element. It has the following XML forms:

```
...
<conditional>
    <goto>$newState</goto>
</conditional>
...
<conditional>
    <continue>$newState</continue>
<conditional>
...
<conditional>
    <if>
        <test>conditionalStatement</test>
        <then>Goto_or_Continue</then>
    </if>
<conditional>
...
<conditional>
    <if>
        <test>conditionalStatement</test>
        <then>Goto_or_Continue</then>
        <else>Goto_or_Continue</else>
    </if>
<conditional>
```

where the state to goto or continue to is either a string literal (as shown here) or a string Attribute reference (like _message.fieldName or entity.VariableName). conditionalStatment has the form “AttributeReference” “opcode” “AttributeOrNumericLiteralReference”. Opcode is one of:

== for equal
!= for not equal
> for greater than
< for less than
>= greater than or equal
<= for less than or equal String Attributes may be compared. The comparison uses Java string comparison. Integers and Longs may be compared (even together). Timestamps may be compared. Comparisons use JavaScript or Perl-type semantics: a comparison either completely succeeds or it fails. This means that a comparison against a non-existent Attribute always fails, and null-to-null comparisons fail. The difference between <goto> and <continue> has to do with what happens when the new state is reached. <goto> jumps to the new state and stops. The next incoming message will happen in the new state. <continue> jumps to the new state and continues to operate with the current message.

Note: The entity.state variable is maintained, but has slightly new semantics. This variable contains the name of the current state. Without conditionalPlugin, the state transition occurred before transition plug-in processing. Now, the state transition happens after transition plug-in processing.

2.12.1 Some Idioms

The simple <conditional> syntax can lead to some surprisingly complex semantics. For instance, subroutine semantics can be had using:

```
... in state A...
<compute>entity.return = entity.state</compute>
<conditional>
    <continue>$subroutine</continue>
</conditional>
...in state subroutine, do common processing followed by...
<conditional>
<goto>entity.return</goto>
</conditional>
```

The “call” to the subroutine may be wrapped in an <if>.

Using multiple <if>s allows a computed-goto or switch semantics.

2.12.2 ConditionalParseElement Implements ParseElement, Plugin

ConditionalParseElement operates like other Event Engine Plug-in elements. It registers for its element, “conditional”. It parses the <conditional> subtree, storing information to pass to ProcessConditional. It includes the following public methods:

conditionalParseElement( )—the constructor initializes data members intitialize(Node aNode, String aRootPath, ErrorHandler aErrorHander)—this method stores aErrorHandler in a private data variable for use in error situations. It then parses the <conditional> subtree (under aNode) into private data members associated with the various parts: Destination objects for <goto> <continue> <then> or <else>; Condition object for <test>.

getProcessElement( )—returns a ProcessConditional object with the appropriate parsed data (e.g., Destination for goto/continue)

factory( )—returns a ConditionalParseElement object getKey( )—returns “conditional” thus registering as a plugin for <conditional>

2.12.3 ProcessConditional Implements ProcessElement

The EventEngine uses ProcessConditional to process a particular instance of a transition. It is instantiated with data for its particular transition processing. It includes the following public methods:

ProcessConditional(ErrorHandler aErrorHandler, Condition aTest, Destination aThen, Destination aElse)—this constructor is used in the if/then/else case. The arguments are stored in private data members ProcessConditional(ErrorHandler aErrorHandler, Destination aDest)—this constructor is used in the unconditional jump cases (goto/continue). The arguments are stored in private data members Process(Session aSession, Message aMessage, ArrayList aMessages)—process a transition. If this is an unconditional jump then call jump( ) (see below). Otherwise, evaluate the mTest condition. If suceeds, then jump(mThen) else if mElse exists, jump(mElse)

ProcessConditional uses a private jump(Destination aDest) method to go the appropriate Destination. This method evaluates the state name using the current Session. (The state may be stored in an Attribute or may be a string literal.) If the evaluation fails, then call the ErrorHandler. Otherwise, call the Session object to set the new state and mark the Session as having transited. If this is a continue, then mark the Session as "go on".

2.12.4 Destination

The Destination object captures information about a destination state for a goto or continue element. It has private data members for the destination state and for "keep going". Keep going indicates this is a continue (otherwise it is a goto). Destination has accessor functions for these data members.

Of course, various changes and modifications to the illustrative embodiment described above will be apparent to those skilled in the art. For example, both the event engine spec as well as the event engine itself may be implemented in various languages other than XML and Java, respectively, such as C++, XWindows, etc., or any hand-crafted language. These changes and modifications can be made without departing from the spirit and the scope of the invention and without diminishing its attendant advantages. It is therefore intended that such changes and modifications be covered by the following claims except insofar as limited by the prior art.

What is claimed is:

1. An apparatus comprising:

computer storage storing an event engine that implements at least one finite state machine (FSM) comprising states and event-driven transitions between the states, a specification expressed in a computer language, that specifies for each one of a plurality of the transitions a set of one or more actions to be performed upon occurrence of that transition, and executable plug-ins whose execution implements the actions specified by the sets; and a processor, coupled to the computer storage, that executes the stored event engine, and responds to occurrence of an event by causing the event engine to undergo one of the transitions that is driven by the event, and responds to occurrence of the undergone transition by executing those plug-ins that implement the actions of the set that corresponds to the undergone transition.

2. The apparatus of claim 1 wherein:

the specification is expressed in extensible markup language (XML).

3. The apparatus of claim 1 wherein:

the computer storage further stores a schema expressed in a computer language, that defines the specification; and the processor uses the specification and the schema to construct the event engine.

4. The apparatus of claim 3 wherein:

the schema is expressed in either XSCHEMA or a DTD.

5. The apparatus of claim 1 wherein:

the processor executes a portion of the stored event engine to parse the specification to identify the transitions and the sets of actions for the transitions, the processor executes a corresponding plug-in for each action specified in each set to create a corresponding executable processing element, and associates the processing elements corresponding to each set with the corresponding transition; and the processor executes another portion of the stored event engine to respond to occurrence of an event by causing the FSM to undergo the transition driven by the event and to execute the processing elements that are associated with the transition.

6. The apparatus of claim 5 wherein:

the specification is expressed in extensible markup language (XML);

the event engine comprises executable objects;

each plug-in comprises an executable object; and each processing element comprises an executable object.

7. The apparatus of claim 6 wherein:

each executable object is an instance of a Java class.

8. The apparatus of claim 5 wherein:

a new processing element is added by adding a corresponding plug-in and referencing the plug-in in the specification.

9. The apparatus of claim 1 wherein:

each syntax element in the specification corresponds to a name of a corresponding one of the plug-ins.

10. The apparatus of claim 1 wherein:

each plug-in has a name that corresponds to a syntax element in the specification.

11. The apparatus of claim 1 wherein:

all of the plug-ins have a same interface.

12. A method comprising:

using a specification expressed in a computer language to initialize by a processor an executable event engine that implements at least one finite state machine (FSM) comprising states and event-driven transitions between the states, including specifying, for each one of a plurality of the transitions, a set of one or more actions to be performed upon occurrence of that transition;

providing executable plug-ins whose execution implements the actions;

in response to occurrence of an event, executing the event engine by the processor to cause the event engine to undergo one of the transitions that is driven by the event, and in response to the undergone transition, executing by the processor those plug-ins that implement the actions of the set that corresponds to the undergone transition.

13. The method of claim 12 wherein:

the specification is expressed in extensible markup language (XML).

14. The method of claim 12 further comprising:

using a schema expressed in a computer language to define the specification; and using the schema and the specification to construct the event engine by the processor.

15. The method of claim 14 wherein:

the schema is expressed in either XSCHEMA or a DTD.

16. The method of claim 12 wherein:

using comprises parsing the specification by executing the event engine to identify the transitions and the sets of actions for the transitions for each action specified in each set, executing the corresponding plug-in to create a corresponding executable processing element, associating the processing elements corresponding to each set with the corresponding transition; and executing plug-ins comprises in response to the undergone transition, the event engine effecting execution of the processing elements that are associated with the transition.

17. The method of claim 15 wherein:

the specification is expressed in extensible markup language (XML); and the event engine, the plug-ins, and the processing elements are implemented as executable objects.

18. The method of claim 17 wherein:

each executable object is an instance of a Java class.

19. The method of claim 15 further comprising:

adding a new processing element by adding a corresponding plug-in and referencing the plug-in in the specification.

20. The method of claim 12 wherein:

providing comprises naming each plug-in with a name that corresponds to a syntax element in the specification.

21. The method of claim 12 wherein:

providing comprises naming each syntax element in the specification with a name of a corresponding plug-in.

22. The method of claim 12 wherein:

providing comprises defining all of the plug-ins to have a same interface.

* * * * *